Sept. 2, 1924.
J. M. BAGWELL
POLE PROTECTOR
Filed Aug. 5, 1922
1,507,103
2 Sheets-Sheet 1
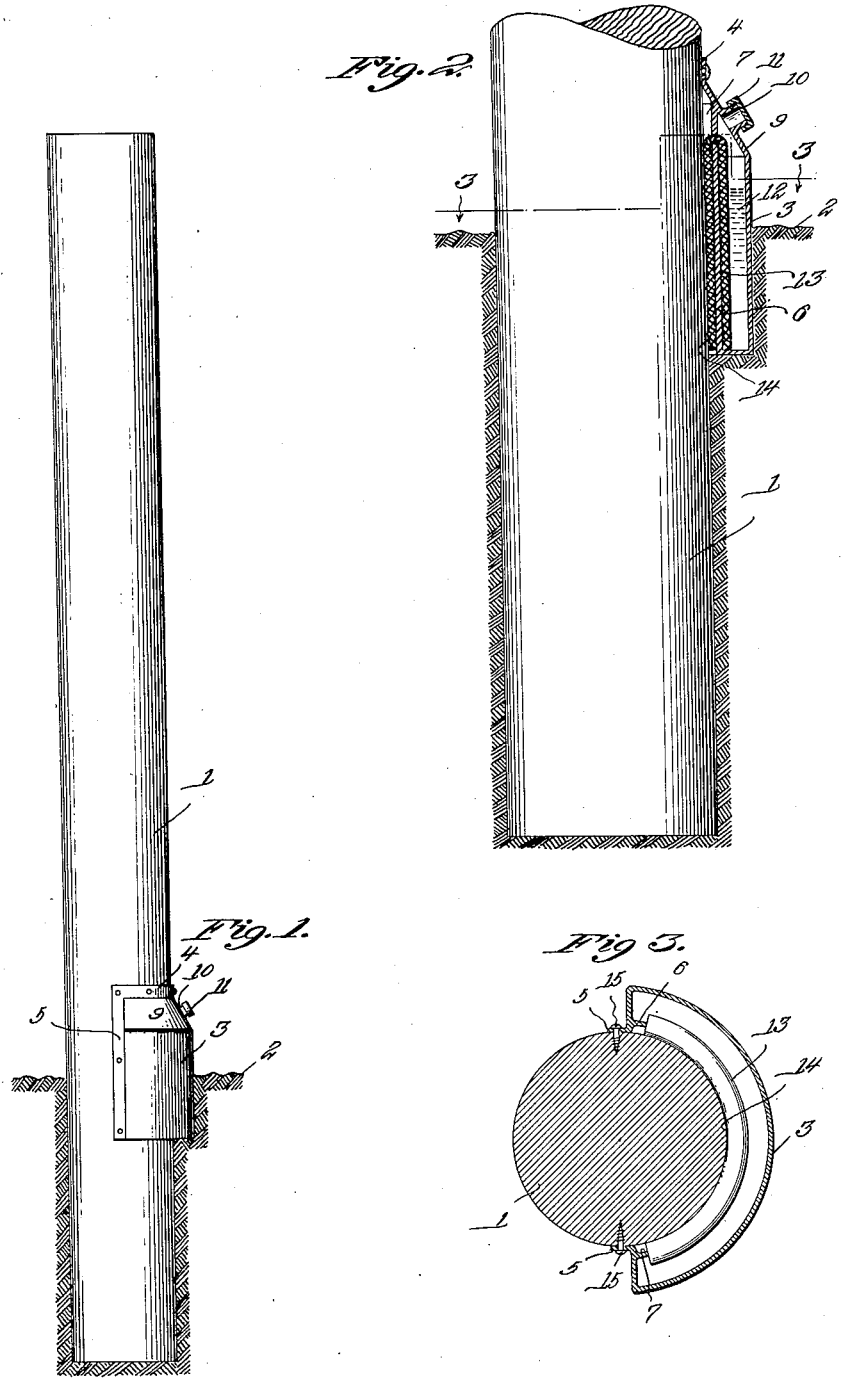
John M. Bagwell
INVENTOR
BY Victor J. Evans
ATTORNEY Sept. 2, 1924.  
J. M. BAGWELL  
POLE PROTECTOR  
Filed Aug. 5, 1922
1,507,103
2 Sheets-Sheet 2
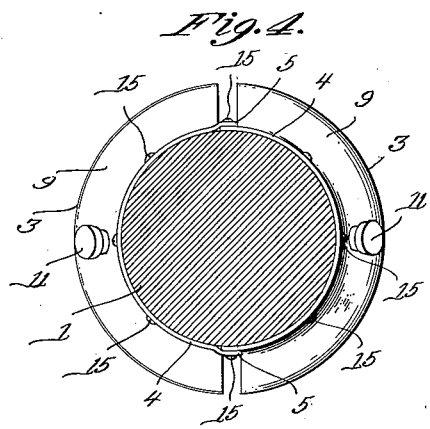
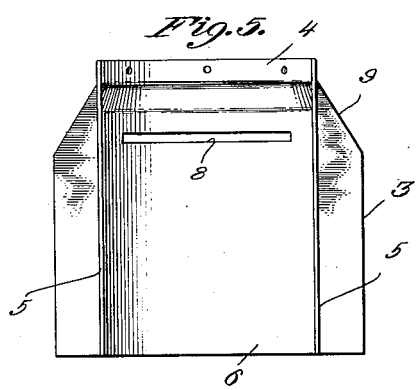
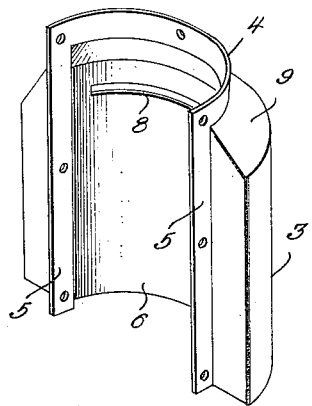
John M. Bagwell  
INVENTOR
BY Victor J. Evans  
ATTORNEY
WITNESS:

Patented Sept. 2, 1924.

1,507,103

UNITED STATES PATENT OFFICE.

JOHN M. BAGWELL, OF CHICO, CALIFORNIA.

POLE PROTECTOR.

Application filed August 5, 1922. Serial No. 579,839.

*To all whom it may concern:*

Be it known that I, JOHN M. BAGWELL, a citizen of the United States, residing at Chico, in the county of Butte and State of California, have invented new and useful Improvements in Pole Protectors, of which the following is a specification.

My present invention has reference to a means for preserving and strengthening a wooden post at the portion thereof that extends a suitable distance both above and below the surface of the ground in which the post is set.

The object of the invention is to produce a means which will prevent the decay of the post which usually takes place, in an unprotected pole, at or near the surface of the ground, as well as to reinforce and strengthen such portion of a post.

It is a further object to arrange on the outer face of a post or pole, at the portion thereof most susceptible to decay, a casing which contains a preservative and which has its top of a formation to provide a water shed, while disposed in the casing and having its outer portion in direct contact with the post is a capillary agent whereby the preservative will be constantly fed to the post.

Other objects and advantages will present themselves as the nature of the invention is better understood, reference being had to the drawings which accompany and which form part of this specification.

In the drawings:—

Figure 1 is a view of a post or pole embedded in the ground and provided with the improvement.

Figure 2 is a similar view, on an enlarged scale with the improvement in section.

Figure 3 is a sectional view approximately on the line 3—3 of Figure 2.

Figure 4 is a sectional view through a post provided with two casings which almost entirely surround the post, in accordance with this invention, the casings being in elevation.

Figure 5 is an inner face view of the improvement.

Figure 6 is a perspective view of the improvement removed from the post.

A post or pole, indicated by the numeral 1 in the drawings, is set in the ground, the surface of which is indicated by the numeral 2. The post or pole 1 is round in cross section in the illustration and consequently the inner face of the improvement is concaved. It is, of course, to be understood that the improvement may have its inner face shaped to correspond with the outer contour of the different shapes of posts or poles on which it is arranged.

As disclosed by the drawings, the casing, in accordance with my invention, is secured on the post, has its bottom portion embedded in the ground and its top above the ground surface 2. The casing, indicated by the numeral 3 is preferably constructed of metal, and includes a body which is segmental in plan and in cross section. The rounded body is less than one-half of a circle whereby two of the casings may be arranged on the opposed faces of a post or pole and secured thereto. The inner concaved face of the casing has its top and sides provided with projecting flanges 4 and 5 respectively, the said flanges having apertures through which are passed the securing means. The inner face of the casing is disposed a slight but suitable distance inward of the flanges 4 and 5 and is indicated by the numeral 6. This provides a space 7 between the inner face and the inner edges proper of the casing, and the face plate 6, below the upper flange 4 has a transversely arranged opening 8 therethrough. The top 9 of the casing is disposed at a downward inclination whereby moisture will be effectively shed therefrom. The top is provided with an opening that is surrounded by a threaded flange 10, and on this opening there is screwed a cap 11. The opening in the top of the flange provides a means whereby a liquid preservative 12 may be inserted in the casing. Also in the casing there is a capillary agent, such as a weight 13. This weight is directed in the face plate 6, so that the outer portion thereof, indicated for distinction by the numeral 14 is disposed in contacting relation to the portion of the post or pole on which the casing is secured. The securing means for the casing are preferably in the nature of wood screws 15.

The absorbent quality of the weight will cause the preservative to be automatically applied to the post. The casing can be filled with such preservative from time to time. The preservative is not only applied to the portion of the post directly contacted by the weight, but as a passage is formed between the bottom of the casing, the face 6 and the flanges 4 and 5, a certain amount of the preservative will flow downwardly on the post, and it is thought that the foregoing description when taken in connection with the drawings will fully set forth the advantages of the improvement.

Having described the invention, I claim:—

1. In a device for impregnating a standing pole with a liquid preservative, a casing having projecting flanges to be secured to the pole and having a transverse slot between said flanges for the passage of a capillary agent to permit of the outer portion of the said agent contacting the pole and the inner portion thereof to be immersed in a liquid preservative in the casing.

2. In a device for impregnating a standing pole with a liquid preservative, a casing containing a liquid preservative and having its inner face shaped to conform to the cross sectional contour of the pole, said casing having extending top and side flanges through which are passed elements for attaching the casing to the pole, said casing having a transverse opening adjacent to its top for the passage of a capillary agent to permit one portion thereof being arranged against the pole and the other received in the casing and in the liquid preservative therein.

3. A device for impregnating a standing pole with a liquid preservative, comprising a casing having its inner face of a contour corresponding to that of a pole to which it is to be attached, and having its inner and upper edges flanged for the reception of elements which secure the casing on the pole, said casing having its top arranged at a downward inclination and provided with a normally closed inlet opening for a liquid preservative, the inner face of the casing, below the top thereof having a transverse opening through which is passed a centrally folded wick, the inner fold of which being immersed in the preservative, and the outer fold being forced by the casing into contacting engagement with the pole.

In testimony whereof I affix my signature.

JOHN M. BAGWELL.